US005975145A

United States Patent [19]

Brown et al.

[11] Patent Number: 5,975,145

[45] Date of Patent: Nov. 2, 1999

[54] ARC-QUENCHING FUSE TUBES

[75] Inventors: Frederick J. Brown, Bloomington, Ind.; Allan G. Loosemore, Greensboro, N.C.; Ian J. Harvey; Brent A. Sievers, both of Bloomington, Ind.

[73] Assignee: ABB Power T&D Company Inc., Raleigh, N.C.

[21] Appl. No.: 08/651,710

[22] Filed: May 21, 1996

[51] Int. Cl.$^{6}$ .......... F16L 9/14

[52] U.S. Cl. .......... 138/140; 138/174; 138/177

[58] Field of Search .......... 138/140, 174, 138/177, 130, 124

[56] References Cited

U.S. PATENT DOCUMENTS

| | | | |
|---|---|---|---|
| 3,761,660 | 9/1973 | Jones | 200/144 |
| 3,979,709 | 9/1976 | Healey, Jr. | 337/186 |
| 4,124,836 | 11/1978 | Wilks | 337/186 |
| 4,175,593 | 11/1979 | Sack . | |
| 4,342,978 | 8/1982 | Meister . | |
| 4,349,803 | 9/1982 | Tobin . | |
| 4,373,555 | 2/1983 | Mattuck et al. | 138/140 |
| 4,373,556 | 2/1983 | Bergh . | |
| 4,713,645 | 12/1987 | Razavi . | |
| 4,817,673 | 4/1989 | Zoghby et al. . | |
| 4,855,705 | 8/1989 | Norancic et al. . | |
| 5,015,514 | 5/1991 | Rinehart . | |
| 5,406,871 | 4/1995 | Lambert, Jr. . | |
| 5,468,786 | 11/1995 | Bayer et al. | 522/170 |

*Primary Examiner*—James F. Hook

*Attorney, Agent, or Firm*—Woodcock Washburn Kurtz Mackiewicz & Norris LLP

[57] ABSTRACT

Arc-quenching fuse tubes comprising an elongated tubular body having an inner arc-quenching surface layer which comprises an arc-quenching matrix comprising a fibrous material and an arc-quenching composition. The arc-quenching compositions comprise a cured composition of an aromatic epoxy resin and a linear aliphatic epoxy resin.

33 Claims, No Drawings

ARC-QUENCHING FUSE TUBES

FIELD OF THE INVENTION

The present invention relates to arc-quenching fuse tubes. More particularly, the present invention relates to arc-quenching fuse tubes which are based on synthetic resins.

BACKGROUND OF THE INVENTION

Arc-quenching fuse tubes are well-known in the art and are typically used with electrical cutouts or similar equipment to suppress and/or quench electrical arcing. Arcing can occur when fuse link melting is induced by a fault during operation of an electrical system. To restore normal operation of the system, it is desirable to suppress the arc and clear the fault. Fuse tubes may serve this purpose, and are preferably capable of suppressing and removing arcing conditions repeatedly.

Fuse tubes, and especially the inner surfaces of fuse tubes, are typically formulated from horn fiber, also referred to as bone fiber. Horn fiber is a naturally-occurring substance and is composed largely of keratinous material, which is a tough, fibrous protein. Upon exposure to an electrical arc, horn fiber can decompose, typically via ablation or vaporization. This decomposition generally results in the rapid generation and evolution of gases which interrupt and quench the electrical arc. Horn fiber also possesses desirable mechanical strength and is generally capable of withstanding the high temperature and pressure conditions that can be created by electrical arcs.

Despite the various benefits of horn fiber, including those described above, there are many undesirable drawbacks associated with horn fiber. In this connection, the supply of horn fiber is generally very limited, and its continued availability is uncertain. The manufacture of horn fiber and products which contain horn fiber, such as fuse tubes, is difficult and time-consuming. This tends to increase the cost of horn fiber and horn fiber products.

Generally, fuse tubes contain a liner formulated from horn fiber with a surrounding layer or shell of a synthetic polymeric resin and/or glass fiber. Difficulty has been encountered in achieving a satisfactory bond between the horn fiber liner and this outer layer. In most cases, only a weak mechanical bond can be achieved. Horn fiber is undesirable for this reason also.

Due to the various drawbacks associated with horn fiber, including those discussed above, attempts have been made to develop fuse tubes from materials other than horn fiber. For example, Mattuck et al., U.S. Pat. No. 4,373,555 and Bergh, U.S. Pat. No. 4,373,556, generally disclose cutout fuse tubes which comprise a core or lining of an epoxy resin reinforced with at least about 45% by weight of a polyester fiber. Aluminum trihydrate is incorporated in the Mattuck et al. fuse tubes in an amount of no more than 15% by weight. Although described as a flame retardant, aluminum trihydrate would have very limited flame suppression characteristics at the concentrations disclosed, and would contribute very little, if any, to arc extinguishment.

Fuse tubes in which higher amounts of aluminum trihydrate are incorporated in a synthetic resinous core are disclosed in Rinehart, U.S. Pat. No. 5,015,514. The Rinehart patent teaches the incorporation in the inner core of from about 40% to about 80% by weight of aluminum trihydrate. Such high amounts of aluminum trihydrate can create significant processing difficulties during manufacture of the fuse tubes including, for example, significantly increased viscosities of the resinous compositions. This high viscosity creates handling problems and mixing difficulties, and increased processing times.

Difficulty has also generally been encountered in the manufacture of fuse tubes from synthetic resins, irrespective of the presence of aluminum trihydrate. In this connection, fuse tubes manufactured from synthetic resins are typically manufactured by drawing a fiber, for example, a polyester fiber, through a resin formulation. The resin-coated fiber is then wound, for example, around a mandrel. It is generally desirable to minimize the formation of gaps between adjacent turns of the coated fiber on the mandrel inasmuch as gaps can deleteriously affect the arc-quenching properties of fuse tubes, and ultimately lead to their failure. Methods for preparing fuse tubes from synthetic resins and fibrous materials in which gaps are substantially prevented have generally been unavailable heretofore.

Accordingly, new and/or better fuse tubes and methods for their preparation are needed. The present invention is directed to these, as well as other important ends.

SUMMARY OF THE INVENTION

The present invention is directed, in part, to arc-quenching fuse tubes. Specifically, in one embodiment, there is provided an arc-quenching fuse tube which comprises an elongated tubular body having an inner arc-quenching surface layer. The inner arc-quenching surface layer comprises an arc-quenching matrix comprising a fibrous material and an arc-quenching composition. The arc-quenching composition comprises a cured composition of an aromatic epoxy resin and a linear aliphatic epoxy resin.

Another embodiment of the invention also relates to an arc-quenching fuse tube. The fuse tube is prepared by a process comprising providing a coated fibrous material which comprises a fibrous material substantially coated with a composition comprising an aromatic epoxy resin and an aliphatic epoxy resin. The coated fibrous material is wound around a support member at a winding angle which substantially prevents the formation of gaps.

Yet another embodiment of the invention relates to an arc-quenching fuse tube. The fuse tube is prepared by a process comprising providing a core which is prepared by a process that comprises winding around a support member at a first angle a coated fibrous material. The process further comprises providing an outer shell substantially completely surrounding the core. The outer shell is prepared by a process that comprises winding around the core at a second angle the coated fibrous material.

Still another embodiment of the invention relates to an arc-quenching matrix. The matrix comprises a fibrous material and an arc-quenching composition comprising a cured composition of an aromatic epoxy resin and a linear aliphatic epoxy resin.

Yet another embodiment of the invention relates to a curable fibrous composition comprising a fibrous material and a composition which comprises an aromatic epoxy resin and a linear aliphatic epoxy resin.

Another embodiment of the invention relates to a curable composition comprising an aromatic epoxy resin, a linear aliphatic epoxy resin and an inorganic filler.

Still another embodiment of the invention relates to a process for the preparation of an arc-quenching fuse tube. The process comprises providing a coated fibrous material which is wound around a support member at a winding angle which substantially prevents the formation of gaps between adjacent fiber turns.

Another embodiment of the invention relates to a process for quenching in an electrical system an electrical arc. The process comprises including in the system an arc-quenching fuse tube. At least the inner surface layer of the tube comprises an arc-quenching matrix comprising a fibrous material and an arc-quenching composition. The arc-quenching composition comprises a cured composition of an aromatic epoxy resin and a linear aliphatic epoxy resin.

Yet another embodiment of the invention relates to a process of using in at least an inner surface layer of a fuse tube to quench electrical arcing an arc-quenching matrix. The matrix comprises a fibrous material and an arc-quenching composition comprising a cured composition of an aromatic epoxy resin and a linear aliphatic epoxy resin.

These and other aspects of the invention will become more apparent from the present description and claims.

DETAILED DESCRIPTION OF THE INVENTION

The present invention is directed, in part, to fuse tubes for use in electrical systems. The fuse tubes are desirably capable of quenching arcs which may occur in the electrical systems. The term "quenching", as used herein, generally refers to the suppression, extinguishment and/or quenching of an electrical arc. In preferred embodiments, the fuse tubes of the present invention may exhibit superior structural endurance and resistance to erosion during use. The present fuse tubes also preferably exhibit increased lifetimes and are preferably capable of quenching electrical arcs repeatedly. Preferably, the lifetime of a fuse tube of the present invention is at least about twice the lifetime of a prior art fuse tube which is prepared from horn fiber and which has similar dimensions. More preferably, the lifetime of a fuse tube of the present invention is greater than about twice the lifetime of a prior art fuse tube which is prepared from horn fiber and which has similar dimensions, for example, about three, four or five times, the lifetime of the aforesaid prior art fuse tubes. These desirable lifetimes are achieved in embodiments of the present invention without the use of substantial amounts of inorganic fillers, such as, for example, 40% or more by weight, which has generally been necessary heretofore. As noted above, the use of such high concentrations of inorganic fillers generally results in increased processing difficulties including, for example, increased viscosities and prolonged mixing times of compositions containing the fillers.

The fuse tubes of the present invention also possess desirable resistance to weather, especially moisture. For example, prior art fuse tubes, including fuse tubes prepared from horn fiber, are generally highly water absorbent. This is generally attributable to the horn fiber portion of these prior art fuse tubes. The absorption of water typically causes swelling, at least in the portion of the fuse tube which is made from horn fiber. As the fuse tubes dry, the horn fiber portion typically shrinks away from the outer layer of the synthetic polymeric resin and/or glass fiber. This often results in physical damage to the fuse tube and/or decreased fuse tube lifetimes. As noted above, the fuse tubes of the present invention are substantially non-absorbent to liquids, including water. Accordingly, the tendencies of prior art fuse tubes to absorb water, thereby causing swelling, and thereafter shrinking as the fuse tubes dry, are substantially lacking in the fuse tubes of the present invention.

The fuse tubes of the present invention generally comprise elongated, tubular or cylindrical bodies having an inner surface layer and an outer surface layer. In preferred embodiments, at least the inner surface layer of the tubular bodies comprises an arc-quenching surface layer. If desired, both the inner surface layer and the outer surface layer may comprise arc-quenching surface layers. The arc-quenching surface layer preferably comprises an arc-quenching matrix of a fibrous material and an arc-quenching composition. The term "matrix", as used herein, generally refers to the product obtained upon curing a mixture of a fibrous material and a curable composition. A wide variety of fibrous materials are available and can be employed in the inner surface layer of the fuse tubes. In preferred embodiments, the fibrous materials are in the form of a filamentary material. The term "filamentary material", as used herein, refers to continuous fibers which may be made by extrusion from a spinneret. The fibrous materials employed in the arc-quenching matrix may comprise individual fiber strands or bundles of individual fiber strands. Exemplary fibrous materials which can be used include, for example, polyester, rayon, acrylic, cellulose, nylon, cotton, glass fibers, and the like. Preferred among the foregoing fibrous materials are polyesters, with polyesters which are derived from dihydric alcohols and terephthalic acid being more preferred. Exemplary of these latter types of polyesters is, for example, polyethylene terephthalate. A polyethylene terephthalate which may be particularly suitable for use as the fibrous materials in the present fuse tubes is commercially available from DuPont Chemical Co. (Wilmington, Del.) under the trademark DACRON®. Other fibrous materials, in addition to those exemplified above, would be apparent to one skilled in the art, once armed with the present disclosure.

The amount of fibrous material which may be included in the inner surface layer of the fuse tubes can vary and depends, for example, on the particular fibrous material and arc-quenching composition employed. Generally speaking, the fibrous material may be present in the arc-quenching matrix, based on the total weight of the matrix, in an amount of from about 5 to about 80% by weight, and all combinations and subcombinations of ranges therein. Preferably, the fibrous material is present in the arc-quenching matrix in an amount of from about 10 to about 75% by weight, with amounts of from about 15 to about 70% by weight being more preferred. Even more preferably, the fibrous material is present in the arc-quenching matrix in an amount of from about 20 to about 65% by weight, with amounts of from about 25 to about 60% by weight being still more preferred. Yet more preferably, the fibrous material is present in the arc-quenching matrix in an amount of from about 30 to about 55% by weight, with amounts of from about 35 to about 50% by weight being even more preferred. In especially preferred embodiments, the fibrous material is present in the arc-quenching matrix in an amount of from about 40 to about 45% by weight.

As noted above, the arc-quenching matrix further comprises an arc-quenching composition. The term "arc-quenching composition", as used herein, generally refers to the product obtained by curing a curable composition containing one or more curable polymeric materials. In preferred embodiments of the invention, the arc-quenching composition may be derived from a curable composition comprising an aromatic epoxy resin and an aliphatic epoxy resin. A wide variety of aromatic epoxy resins and aliphatic epoxy resins may be employed in the present curable compositions. Epoxy resins are generally commercially available or can be prepared using techniques well known to those skilled in the art. It is generally preferable to select aromatic and aliphatic epoxy resins which provide the arc-quenching composition and arc-quenching matrix with desirable properties, including, for example, electrical arc suppression, as well as resistance to erosion and structural integrity to assure increased interrupting cycle lifetimes.

In preferred embodiments of the present invention, the aromatic epoxy resin may be a bisphenol A resin or an epoxy novolak resin. The bisphenol A resins preferably comprise diglycidyl ether bisphenol resins which may be derived from bisphenol A (2,2-bis(4-hydroxyphenol)propane) and epichlorohydrin. The epoxy novolak resins are preferably derived from novolak (phenol-formaldehyde) resins and epichlorohydrin. Preferred among the aromatic epoxy resins are the bisphenol A resins. A bisphenol A resin which may be particularly suitable for use as the aromatic epoxy resins in the present curable compositions is commercially available from Thermoset Plastics, Inc. Co. (Indianapolis, Ind.) as THERMOSET™ EP-677. Other aromatic epoxy resins, in addition to those exemplified above, would be readily apparent to one skilled in the art, based on the present disclosure.

As noted above, the curable compositions further preferably comprise an aliphatic epoxy resin. The term "aliphatic epoxy resin", as used herein, refers to epoxy resins which may contain substantially no aromatic groups. In preferred form, the aliphatic portions of the aliphatic epoxy resins may comprise alkyl (saturated) groups, alkenyl groups and/or alkynyl groups, with alkyl groups being preferred. The aliphatic epoxy resins employed in the present curable compositions preferably comprise linear aliphatic epoxy resins. The term "linear aliphatic epoxy resins", as used herein, refers to aliphatic epoxy resins in which the aliphatic groups may contain substantially no cyclic moieties, including cycloaliphatic groups. The term "linear aliphatic epoxy resins", as used herein, also refers to aliphatic epoxy resins in which the aliphatic groups may be substantially straight chain and may contain substantially no branching groups.

In particularly preferred embodiments of the present invention, the aliphatic epoxy resin comprises the reaction product of a linear polyglycol and epichlorohydrin. Epoxy resins which may be derived from a polyglycol and epichlorohydrin which may be particularly suitable for use as the aliphatic epoxy resin are commercially available from The Dow Chemical Co. (Midland, Mich.) under the trademark DERO®. Other aliphatic epoxy resins, in addition to the resins exemplified above, would be readily apparent to one skilled in the art, based on the present disclosure.

The amount of aromatic epoxy resin and aliphatic epoxy resin which is present in the curable compositions may vary and depends, for example, on the particular aromatic and aliphatic epoxy resins and fibrous material employed. Generally speaking, the aromatic epoxy resin may be present in the curable composition, based on the total weight of the composition, in an amount of from about 5% to about 65% by weight, and all combinations and subcombinations of ranges therein. Preferably, the aromatic epoxy resin may be present in the curable compositions in an amount of from about 10% to about 60% by weight, with amounts of from about 15% to about 55% by weight being more preferred. Even more preferably, the aromatic epoxy resin may be present in the curable compositions in an amount of from about 20% to about 50% by weight, with amounts of from about 25% to about 45% by weight being more preferred. Still more preferably, the aromatic epoxy resin may be present in the curable compositions in an amount of from greater than about 25% to about 40% by weight, with amounts of from about 29% to about 37% by weight being yet more preferred.

The aliphatic epoxy resin may be present in the curable composition, based on the weight of the composition, in an amount of from about 0.5 to about 10%, and all combinations and subcombinations of ranges therein. Preferably, the aliphatic epoxy resin may be present in the curable compositions in an amount of from about 1% to about 7% by weight, with amounts of from greater than about 1% to about 6% by weight being more preferred. Even more preferably, the aliphatic epoxy resin may be present in the curable compositions in an amount of from about 2% to about 5% by weight, with amounts of from about 3% to about 4% by weight being still more preferred.

In accordance with preferred embodiments of the present invention, the arc-quenching composition further comprises an inorganic filler. The inorganic filler is preferably capable of generating and/or releasing molecular water upon exposure to arcing conditions. Without intending to be bound by any particular theory or theories of operation, it is contemplated that, during electrical arcing conditions, the polymeric materials in the arc-quenching compositions may decompose to carbon products. The water released from the inorganic filler may react with these carbon products to produce gas, such as carbon monoxide or hydrogen gas. These gases are believed to assist in the quenching of the arc.

Preferably, the water in the inorganic filler is not generated and/or released at normal curing temperatures, including, for example, temperatures of up to about 150° C., but is generated and/or released upon exposure to arcing conditions, including, for example, temperatures substantially greater than about 150° C., for example, about 300° C. or greater. Preferably, the inorganic filler contains about 35% by weight of water. In particularly preferred embodiments, the inorganic filler comprises aluminum trihydrate.

In preferred form, the inorganic filler is a particulate solid such as, for example, a free-flowing powder. The particle size of the filler can vary and may be selected, as desired. Preferably, the inorganic filler comprises particles which are sized from greater than about 0.1 $\mu$ mesh to about 20 $\mu$ mesh, and all combinations and subcombinations of ranges therein. Thus, the inorganic filler may comprise particles of, for example, about 0.2, 0.3, 0.4 or 0.5 $\mu$ mesh, to less than about 20 $\mu$ mesh, for example, about 19, 18, 17, 16 or 15 $\mu$ mesh. More preferably, the particle size of the inorganic filler is from greater than about 0.5 $\mu$ mesh, for example, about 0.6, 0.7, 0.8 or 0.9 $\mu$ mesh, to less than about 15 $\mu$ mesh, for example, about 14, 13, 12, 11 or 10 $\mu$ mesh. Even more preferably, the particle size of the inorganic filler is from about 1 $\mu$ mesh to about 9 $\mu$ mesh. Aluminum trihydrate which has a particle size of about 1 $\mu$ mesh and which is particularly suitable for use as the inorganic filler is commercially available from The Aluminum Company of America (Bauxite, Ariz.) under the trademark HYDRAL® 710. Aluminum trihydrate which has a particle size of about 9 $\mu$ mesh and which is particularly suitable for use as the inorganic filler is commercially available from J. M. Huber Corp. (Norcross, Ga.) under as SB 4328®.

The amount of inorganic filler which is incorporated in the curable compositions can vary and depends, for example, on the particular epoxy resins and inorganic filler employed. As noted above, the prior art teaches the use of substantially high amounts of inorganic filler, for example, from about 40% to about 80% by weight, more preferably about 45% to about 70% by weight, and usually about 55% to about 60% by weight, in compositions employed in fuse tubes. It has been found, however, that highly undesirable drawbacks may be associated with the use of such high amounts of inorganic filler. For example, compositions containing about 40 or 45% by weight or greater of inorganic filler may possess substantially increased viscosities. This can result undesirably in processing difficulties, including difficulty in mixing and extended mixing times. It has been unexpectedly and surprisingly found that desirable and beneficial results may be obtained when the inorganic filler is used in amounts which may be less than those recommended in the prior art (40% by weight) as a source of molecular water. It has also been found that desirable and beneficial results may be obtained when the inorganic filler is used in amounts which are greater than those recommended in the prior art (15% by weight) to achieve flame retardant properties.

Thus, the inorganic filler is preferably incorporated in the present compositions in concentrations which provide desirable flame retardance and molecular water contribution, while maintaining desirable processing characteristics, including, for example, mixing characteristics, viscosities, and the like, of the curable compositions. Generally speaking, the inorganic filler may be incorporated to provide curable compositions having a viscosity, using a Brookfield viscometer set at about 5 rpm, of no greater than about 2200 centipoise (cps). Preferably, the inorganic filler is incorporated in the curable compositions to provide a viscosity, at about 5 rpm, of from about 1500 to about 2100 cps, and all combinations and subcombinations of ranges therein. More preferably, the inorganic filler is incorporated in the curable compositions to provide a viscosity, at about 5 rpm, of from about 1600 to about 2000 cps, with viscosities of from about 1700 to about 1900 cps being even more preferred. Especially preferred are viscosities at about 5 rpm of about 1800 cps. Alternatively, the inorganic filler may be incorporated to provide curable compositions having a viscosity, using a Brookfield viscometer set at about 20 rpm, of no greater than about 2300 centipoise (cps). Preferably, the inorganic filler is incorporated in the curable compositions to provide a viscosity, at about 20 rpm, of from about 1600 to about 2200 cps, and all combinations and subcombinations of ranges therein. More preferably, the inorganic filler is incorporated in the curable compositions to provide a viscosity, at about 20 rpm, of from about 1700 to about 2100 cps, with viscosities of from about 1800 to about 2000 cps being even more preferred. Especially preferred are viscosities at about 20 rpm of about 1900 cps.

In accordance with preferred embodiments of the invention, the inorganic filler may be incorporated in the curable compositions, based on the total weight of the composition, in an amount of from greater than about 15% to less than about 40% by weight, and all combinations and subcombinations of ranges therein. Thus, the filler may be incorporated in the curable compositions in an amount, for example, of from about 16, 17, 18, 19 or 20%, to about 39% by weight. More preferably, the inorganic filler may be incorporated in the curable compositions in an amount of from about 21% to about 39%, with concentrations of from about 22% to about 39% by weight being even more preferred. In especially preferred embodiments, the inorganic filler may be incorporated in the compositions in an amount of from about 23% to about 39% by weight, with concentrations of from about 24% to about 39% by weight being particularly preferred.

In certain preferred embodiments of the present invention, the curable compositions further comprise an anhydride compound. As known to one of ordinary skill in the art, anhydride cured epoxies are generally characterized by high strength, long pot life, and moderate cost. A wide variety of anhydrides can be employed in the heat curable compositions. Anhydride compounds are generally commercially available and may be prepared using techniques well known to those skilled in the art. As with the epoxy resins discussed above, it is generally preferable to select anhydride compounds which provide the arc-quenching matrix with the desired properties, including, for example, electrical arc suppression, resistance to erosion and structural integrity.

Suitable anhydrides which can be incorporated in the present curable compositions include, for example, hexahydrophthalic anhydride, tetrahydrophthalic anhydride, methylhexahydrophthalic anhydride, methyl tetrahydrophthalic anhydride, and mixtures thereof. Preferably, the anhydride incorporated in the curable compositions is methyl tetrahydrophthalic anhydride.

The amount of the anhydride compound which is incorporated in the present curable compositions can vary, and depends, for example, on the particular anhydride and aromatic and aliphatic epoxy resins employed. In accordance with preferred embodiments of the invention, the anhydride compound may be incorporated in the curable compositions, based on the total weight of the composition, in an amount of from about 5% to about 55% by weight, and all combinations and subcombinations of ranges therein. More preferably, the anhydride compound may be incorporated in the compositions in an amount of from about 10% to about 50% by weight, with concentrations of from about 15% to about 45% by weight being even more preferred. Still more preferably, the anhydride compound may be incorporated in the compositions in an amount of from about 20% to about 40% by weight, with concentrations of from about 25% to about 35% by weight being yet more preferred.

It has been found that improved results may be obtained if a slight stoichiometric excess of the epoxy resins, based on the total amount of both the aromatic and aliphatic epoxy resins, is used in the curable compositions relative to the anhydride compound and based on their respective equivalent weights. This is in contrast to the prior art, which teaches, for example, the use of a stoichiometric excess of the anhydride compound, relative to the epoxy resin. Preferably, the ratio of epoxy resin (combined aromatic and aliphatic epoxy resin) to anhydride compound in the compositions of the present invention is at least about 1.04 to 1, and all combinations and subcombinations of ranges therein. More preferably, the ratio of epoxy resin to anhydride compound is from about 1.04 to 1 to about 1.1 to 1.

In certain preferred embodiments, the curable compositions further comprise a surfactant. The term "surfactant", as used herein, refers to any surface-active compound which is capable of reducing surface tension when dissolved in aqueous solution, or which is generally capable of reducing interfacial tension between two liquids or between a liquid and a solid. It has been found that the surfactant can improve the overall processing of the curable compositions in connection with the preparation of the fuse tubes. For example, it has been found that the surfactant may promote the wetting and/or coating of the fibrous material with the curable compositions. This may enhance the homogenous distribution of the arc-quenching compositions throughout the arc-quenching matrix.

A variety of surfactants may be incorporated in the present curable compositions. Many suitable surfactants are commercially available or may be prepared using techniques well known to those skilled in the art. Exemplary surfactants include, for example, anionic, cationic, nonionic and amphoteric surfactants. The surfactant may comprise polymeric or non-polymeric materials. Preferably, the surfactant comprises a polymeric material. In preferred form, the surfactant may also be a defoaming agent. A surfactant which is particularly suitable for use in the present compositions is commercially available from BYK-Chemie USA (Wallingford, Conn.) under the tradename BYK-A 555. Other surfactants suitable for use in the present compositions would be apparent to one of ordinary skill in the art, once armed with the present disclosure.

The amount of surfactant which is incorporated in the present curable compositions may vary, and depends, for example, on the particular surfactant, epoxy resins, and other materials employed. In preferred embodiments, the surfactant may be incorporated in the compositions in an amount of less than about 5% by weight, based on the total weight of the composition. More preferably, the surfactant may be incorporated in the compositions in an amount of less than about 4% by weight, with concentrations of less than about 3% by weight being even more preferred. Still more preferably, the surfactant may be incorporated in the compositions in an amount of less than about 2% by weight, with amounts of about 1% by weight or less being especially preferred.

To aid in curing, it may be desirable to incorporate an accelerator in the curable compositions. Suitable accelerators include, for example, benzyldimethylamine, 2,4,6-tris (dimethylaminomethyl)phenol, and the like. The amount of the accelerator incorporated in the compositions may vary and depends upon the particular accelerator, epoxy resins, and other materials employed. Generally speaking, the accelerator is incorporated in the compositions in amounts of about 1% or less by weight.

The curable compositions of the present invention may be easily prepared, for example, by combining the selected components in the desired amounts. The combined components may be mixed to provide a substantially homogenous mixture.

The present curable compositions are advantageously employed in fuse tubes, and especially in arc-quenching compositions and matrices in the inner surface layers of fuse tubes. The fuse tubes may be prepared by formulating the curable compositions, as described above. Fibrous material, for example, polyester fibers, such as DACRON®, is contacted with the composition to provide a coated fibrous material. The term "coated fibrous material", as used herein, refers to fibrous material which has been contacted with the curable compositions. The coated fibrous materials may be alternatively referred to herein as "curable fibrous compositions." The fibrous material may be contacted with the curable composition using any suitable technique which would be apparent to one skilled in the art, once armed with the present disclosure. Preferably, the fibrous material is contacted with the curable composition in a fashion which results in substantially completely wetting and/or coating of the fibrous material with the curable composition. For example, the fibrous material may be dipped in the composition for a period of time which assures substantially complete wetting and/or coating of the fibers. Generally speaking, the fiber is dipped in the composition such that any given point along the length of the fiber is contacted with the composition for a period of time of less than about 10 seconds, for example, about 9, 8, 7, 6, or 5 seconds. More preferably, the fiber is dipped in the composition such that any given point of the fiber is contacted with the composition for a period of time of less than about 5 seconds, for example, about 4 or 3 seconds, with contact times of less than about 3 seconds, for example about 1 to 2 seconds, being even more preferred.

It has been found that the wetting or coating of the fibers with the curable composition may be improved by heating the curable composition prior to contact with the fibers. Generally speaking, the curable composition may be heated to a temperature of less than about 140° F. to improve the coating of the fibers. Heating to a temperature of about 140° F. or higher may result in premature curing of the curable composition. Preferably, the curable composition may be heated to a temperature of from about 80° F. to about 120° F., with temperatures of from about 90° F. to about 110° F. being more preferred.

It has also been found that the wetting or coating of the fibers with the curable composition may be improved by drawing the fiber through a roller device after being contacted with the curable composition. Such roller devices are well known in the art, and generally comprise at least a pair of rollers which are in opposed relationship and through which the wetted fibers may travel.

To prepare the fuse tubes, uncured fuse tubes may first be prepared. This may involve winding the coated fibrous material around a cylindrically shaped support member, for example, a mandrel. In preferred embodiments, the mandrel is pretreated prior to conducting the winding operation. This pretreatment surprisingly and unexpectedly enables facile removal of the cured fuse tubes from the mandrel. In preferred embodiments, the pretreatment comprises the application of a lubricant coating to the mandrel. In particularly preferred embodiments, the lubricant coating comprises a fluorocarbon polymeric composition, such as a Teflon® composition. The lubricant coating may be applied to the mandrel using a variety of techniques, including aerosol spraying, painting, dipping the mandrel into the lubricant coating, and the like. A Teflon® composition which is particularly suitable for use as the lubricant coating is a Teflon aerosol commercially available from Miller and Stevenson.

After application of the lubricant coating, the mandrel is preferably heated to an elevated temperature. Preferably, the coated mandrel is heated in an oven at a temperature of about 85° C. for a period of about 1 hour. The mandrel is then removed from the oven. If desired, the mandrel may be permitted to cool prior to initiating the winding operation. However, it is preferable to initiate the winding operation prior to substantial cooling of the mandrel. It has also been found that improved results may be obtained if, prior to initiating the winding operation, the curable compositions of the present invention are applied to the warm mandrel. This may involve, for example, painting the composition directly on the mandrel.

The winding operation may be conducted using any of a variety of techniques which would be apparent to one skilled in the art, based on the present disclosure. Preferably, the coated fibrous material is wound around the support member using methods which substantially prevent the formation of gaps between adjacent turns of the fiber in the uncured tube. As used herein, the term "substantially prevent" refers to the preparation of fuse tubes which are substantially free of gaps between adjacent fiber turns, as observed visually with the naked eye.

Through the course of carrying out extensive experimental work, it has been found that the formation of gaps may be substantially prevented by controlling the winding angle and/or the winding speed of the fibrous material, as well as the number and diameter of the strands of filaments which together comprise the fibrous material. The term "winding angle", as used herein, refers to the angle which is formed between the fibrous material being wound around the support member, and the support member. The term "winding speed", as used herein, refers to the speed at which the fiber is wound around the support member.

In certain embodiments of the invention, the winding angle may be maintained substantially constant throughout the winding operation. In these embodiments, it my also be preferable to maintain a constant winding speed during the winding operation. In other embodiments, the winding angle may be varied during the winding operation. In these latter embodiments, it may also be preferable to vary the winding speed during the winding operation. Generally however, the winding angle is desirably less than about 90°. Preferably, the winding angle is from about 20° to less than about 90°, and all combinations and subcombinations of ranges therein.

The coated fiber is preferably wound around the mandrel at a winding speed of from about 1 inch per second (in/sec) to about 20 in/sec, and all combinations and subcombinations of ranges therein. More preferably, the fiber is wound around the mandrel at a speed of from about 3 in/sec to about 10 in/sec, with winding speeds of from about 4 in/sec to about 7 in/sec being even more preferred.

In certain embodiments of the present invention, the fuse tubes may comprise a substantially single layer construction. In these embodiments, the fuse tube may be substantially completely constructed from the coated fibrous material. Also in these embodiments, the winding angle may be maintained substantially constant throughout the winding operation. Preferably, the winding angle may be maintained during the winding operation from about 20° to less than about 90°, and all combinations and subcombinations of ranges therein. More preferably, the winding angle is from about 25° to less than about 90°, with winding angles of from about 30° to about 80° being even more preferred. Still more preferably, the winding angle in these embodiments may be maintained at from about 35° to about 70° during the winding operation, with winding angles of from about 40° to 60° being yet more preferred. Especially preferred in these embodiments may be winding angles of from about 45° to about 50°, with a winding angle of about 48° being particularly preferred.

In the embodiments of fuse tubes which comprise a substantially single layer construction, the winding operation may be conducted at a winding speed of from about 1 inch per second (in/sec) to about 20 in/sec, and all combinations and subcombinations of ranges therein. Preferably, the winding operation may be conducted at a winding speed of from about 2 in/sec to about 12 in/sec, with winding speeds of from about 4 in/sec to about 9 in/sec being more preferred.

In connection with the preparation of fuse tubes having a single layer construction, the coated fibrous material may be wound around the support member until the desired outer diameter and/or wall thickness are obtained. The outer diameter and wall thickness may vary and depend, for example, on the particular curable resin composition and fibrous material employed, and the contemplated end-use of the fuse tube. Generally speaking, the coated fibrous material is wound around the support member to provide an uncured fuse tube with an outer diameter of from about 0.5 to about 2 inches, and all combinations and subcombinations of ranges therein. Preferably, the coated fibrous material is wound around the support member to provide an outer diameter of from about 0.7 to about 1.5 inches, with an outer diameter of from about 0.8 to about 1.3 inches being more preferred. Even more preferred are outer diameters of about 1 inch.

Generally speaking, the wall thickness of the uncured fuse tubes is from about 0.1 to about 0.5 inch, and all combinations and subcombinations of ranges therein. Preferably, the wall thickness of the uncured fuse tube is from about 0.2 to about 0.3 inch.

In certain other embodiments of the present invention, the fuse tubes may comprise a laminate construction. The term "laminate construction", as used herein, refers to fuse tubes which comprise an inner core and an outer shell which substantially surrounds the core. The inner core and outer shell may be independently substantially completely constructed from the coated fibrous materials. Alternatively, the inner core may be formulated from the coated fibrous materials described above, and the outer shell may be formulated from materials other than the coated fibrous materials and the curable compositions of the present invention. In any case, the outer shell is preferably formulated from materials which may impart desirable strength and structural integrity to the fuse tube. Such materials may include, for example, glass fibers which are impregnated with a polymeric resin. Suitable materials from which the outer shells may be formulated are disclosed, for example, in Bergh, U.S. Pat. No. 4,373,556 and Rinehart, U.S. Pat. No. 5,015,514, the disclosures of which are incorporated herein by reference, in their entirety.

In cases where both the core and shell are independently constructed from the present coated fibrous materials, the winding angle may preferably be varied during the winding operation. Preferably, the core may be formed by winding the coated fibrous material at a first winding angle. After the core is substantially formed, the winding angle may be adjusted to a second winding angle, and the winding operation may be continued until the outer shell is formed. In connection with these winding operations, the first winding angle may be from about 30° to about 90°, and all combinations and subcombinations of ranges therein. Preferably, the first winding angle may be from about 35° to about 85°, with first winding angles of from about 40° to about 80° being more preferred. Yet more preferably, the first winding angle may be from about 45° to about 75°, with first winding angles of from about 50° to about 70° being still more preferred, and first winding angles of from about 55° to about 65° being yet more preferred. In particularly preferred embodiments, the first winding angle may be about 60°.

The second winding angle in the present winding operation may be from about 20° to less than about 90°, and all combinations and subcombinations of ranges therein. Preferably, second winding angle may be from about 25° to less than about 90°, with second winding angles of from about 30° to about 80° being more preferred. Even more preferably, the second winding angle may be from about 35° to about 70°, with second winding angles of from about 40° to about 60° being yet more preferred. Especially preferred may be second winding angles of from about 45° to about 50°, with a second winding angle of about 48° being particularly preferred.

In the embodiments of fuse tubes which comprise a laminate construction, the winding speed for the winding operation in the preparation of the core may be the same as, or different from, the winding speed for the winding operation in the preparation of the outer shell. Generally speaking, the winding operations for the core and shell may be conducted at the same winding speeds as provided above in connection with the winding speeds for the tubes which comprise a substantially single layer construction.

As with the fuse tubes which comprise a single layer construction, the core and shell may be prepared to provide the desired outer diameter and/or wall thickness in the final fuse tube. The outer diameter and wall thickness may vary and depend, for example, on the particular curable resin composition and fibrous material employed, the material from which the outer shell is prepared, the contemplated end-use of the fuse tube, and the like. Generally speaking, the coated fibrous material may be wound around the support member to provide a core with an outer diameter of from about 0.3 to about 1.7 inches, and all combinations and subcombinations of ranges therein. Preferably, the coated fibrous material is wound around the support member to provide an outer diameter for the core of from about 0.5 to about 1.2 inches, with an outer diameter of from about 0.7 to about 1 inches being more preferred. The wall thickness of the uncured core may be from about 0.1 to about 0.5 inch. Preferably, the wall thickness of the uncured core is from about 0.2 to about 0.3 inch.

The coated fibrous material may then be wound around the support member until the desired outer diameter and/or wall thickness of the uncured fuse tube are obtained. Preferably, the outer diameter and wall thickness of fuse tubes having a laminate construction are substantially the same as the outer diameter and wall thickness provided above in connection with the tubes having a substantially single layer construction.

After substantial completion of the winding operations, the uncured fuse tubes may be cured. The methods involved in curing may vary, depending, for example, on the particular epoxy resins employed. Generally speaking, the uncured fuse tubes may be cured by heating to an elevated temperature for a period of time to substantially completely cure the curable compositions. In preferred embodiments, the uncured fuse tubes may be cured by heating to a first temperature which may be maintained for a first period of time. The temperature may then be increased to a second temperature which may be maintained for a second period of time. Preferably, curing may involve heating the uncured fuse tubes to a temperature of about 85° C. for a period of about 4 hours. The temperature may be increased to about 120° C., and the fuse tubes may be maintained at the higher temperature for a period of about 4 hours. After curing is substantially complete, the cured fuse tubes may be allowed to cool prior to removal from the mandrels. However, it has been found that, once cured, the fuse tubes are more easily removed from the mandrels while still warm.

The inner diameter of the arc-quenching fuse tubes of the present invention may vary and depends, for example, whether the tube comprises a substantially single layer or laminate construction, the particular curable resin composition and fibrous material employed, the material from which the outer shell (if present) is prepared, the contemplated end-use of the fuse tube, and the like. Generally speaking, the fuse tubes may possess an inner diameter of from about 0.3 to about 1 inch, and all combinations and subcombinations of ranges therein. Preferably, the inner diameter of the fuse tube is from about 0.4 to about 1 inch, with inner diameters of from about 0.5 to about 0.8 inch being more preferred.

The fuse tubes of the present invention may be advantageously used in electrical systems to quench undesirable electrical arcing. The present fuse tubes may possess extended lifetimes as compared to prior art fuse tubes, and may be used repeatedly to quench electrical arcs. An unexpected and highly desirable advantage of the present invention is that it may be unnecessary to employ, in addition to the preferred polyester fibers, rayon fibers to achieve the aforementioned beneficial characteristics. Prior art fuse tubes may often require the use of such additional rayon fibers. This contributes to the overall cost-savings which may be realized with the fuse tubes of the present invention.

EXAMPLES

The invention is further described in the following examples. The examples are actual examples and are for illustrative purposes only, and are not to be construed as limiting the appended claims.

Example 1

The following examples are directed to the preparation of a fuse tube having a single layer construction.

Example 1A

THERMOSET EP-677 (36.8% by weight), BYK-A 555 (0.5% by weight), DER® 736 (3.7% by weight), HYDRAL® 710 (24.5% by weight), methyl tetrahydrophthalic anhydride (33.7% by weight) and benzyldimethylamine (0.8% by weight) were combined and mixed until homogenous. DACRON® fiber (65.5% by weight) was coated with the mixture and the coated fiber was wound on a mandrel at a winding angle of about 47.5° and a winding speed of about 8.6 inches/min. Winding was continued to provide a wall thickness in the uncured tube of about 0.25 inch and an outer diameter in the uncured tube of about 1.055 inches. The tube was cured by heating in an oven to a temperature of about 85° C. for about 4 hours. The temperature was increased to about 120° C. and the tube was heated an additional 4 hours at this increased temperature. The cured fuse tube was removed from the oven and cooled. The cured fuse tube had a length of 9.6 inches and an inner diameter of 0.5 inch.

Example 1B

Example 1A was repeated, except that the HYDRAL® 710 was replaced with SB 432.

Example 1C

Example 1B was repeated, except that the formulation was modified as follows: THERMOSET EP-677 (31.9% by weight), BYK-A 555 (0.5% by weight), DER® 736 (3.2% by weight), SB 432 (34.6% by weight), methyl tetrahydrophthalic anhydride (29.3% by weight) and benzyldimethylamine (0.7% by weight).

Example 1D

Example 1B was repeated, except that the formulation was modified as follows: THERMOSET EP-677 (29.6% by weight), BYK-A 555 (0.5% by weight), DER® 736 (3.0% by weight), SB 432 (39.0% by weight), methyl tetrahydrophthalic anhydride (27.2% by weight) and benzyldimethylamine (0.7% by weight).

Example 2

The following examples are directed to the preparation of fuse tubes of laminate construction.

Example 2A

DACRON® fiber (27.3 g) was coated with the formulation from Example 1A. The coated fiber was wound on a mandrel at a winding angle of about 60° and a winding speed of about 4.4 inches/min. Winding was continued to provide a wall thickness in the uncured core of about 0.125 inches and an outer diameter in the uncured core of about 0.75 inch. Winding was stopped, and the winding angle was changed to about 47.5°. Winding was resumed using fiberglass coated with the epoxy resin to provide a total wall thickness in the uncured fuse tube of about 0.2775 inch and a total outer diameter in the uncured tube of about 1.055 inch. The tube was cured by heating in an oven to a temperature of about 85° C. for about 4 hours. The temperature was increased to about 120° C. and the tube was heated an additional 4 hours at the increased temperature. The cured fuse tube was removed from the oven and cooled. The cured fuse tube had a length of 9.6 inches and an inner diameter of 0.5 inch.

Example 2B

Example 2A was repeated, except that the HYDRAL® 710 was replaced with SB 432.

Example 2C

Example 2B was repeated, except that the formulation was modified as follows: THERMOSET EP-677 (31.9 g), BYK-A 555 (0.5 g), DER® 736 (3.2 g), SB 432 (34.6 g), methyl tetrahydrophthalic anhydride (29.3 g) and benzyldimethylamine (0.7 g).

Example 2D

Example 2B was repeated, except that the formulation was modified as follows: THERMOSET EP-677 (29.6% by weight), BYK-A 555 (0.5% by weight), DER® 736 (3.0% by weight), SB 432 (39.0% by weight), methyl tetrahydrophthalic anhydride (27.2% by weight) and benzyldimethylamine (0.7% by weight).

Example 3

This example describes tests which were conducted to evaluate fuse tubes within the scope of the present invention.

The fuse tubes prepared in Examples 1 and 2 were subjected to interrupting performance tests in accordance with ANSI/IEEE Standard C37.41-1994, Section 6, test series 1 to 5 per Table 5. The fuse tubes passed these tests satisfactorily.

It should be understood that all ranges described herein include all combinations and subcombinations of ranges therein.

Various modifications of the invention, in addition to those described herein, will be apparent to those skilled in the art from the foregoing description. Such modifications are also intended to fall within the scope of the appended claims.

What is claimed is:

1. An arc-quenching fuse tube comprising an elongated tubular body having an inner arc-quenching surface layer which comprises an arc-quenching matrix comprising a fibrous material coated with an arc-quenching composition which comprises a cured composition of an aromatic epoxy resin and a linear aliphatic epoxy resin.

2. A fuse tube according to claim 1 wherein said fibrous material comprises a filamentary material.

3. A fuse tube according to claim 1 wherein said fibrous material is selected from the group consisting of polyester, rayon, acrylic, nylon, cotton and glass fibers.

4. A fuse tube according to claim 3 wherein said fibrous material comprises polyester fibers.

5. A fuse tube according to claim 1 wherein said aromatic epoxy resin is selected from the group consisting of a bisphenol A resin and an epoxy novolak resin.

6. A fuse tube according to claim 5 wherein said aromatic epoxy resin comprises a bisphenol A resin.

7. A fuse tube according to claim 1 wherein the aliphatic portion of said linear aliphatic epoxy resin comprises alkyl groups.

8. An arc-quenching fuse tube which is prepared by a process comprising:

(a) providing a coated fibrous material; and (b) winding said coated fibrous material around a support member at a winding angle which substantially prevents the formation of gaps between adjacent fiber turns.

9. A fuse tube according to claim 8 wherein said support member comprises a mandrel.

10. A fuse tube according to claim 8 wherein said winding angle is from about 35° to about 70°.

11. A fuse tube according to claim 10 wherein said winding angle is from about 40° to about 60°.

12. A fuse tube according to claim 11 wherein said winding angle is from about 45° to about 50°.

13. A fuse tube according to claim 12 wherein said winding angle is about 48°.

14. A fuse tube according to claim 8 wherein the process further comprises:

(c) curing said coating.

15. An arc-quenching fuse tube which is prepared by a process comprising:

(a) providing a core which is prepared by a process comprising winding around a support member at a first angle a coated fibrous material; and (b) providing an outer shell substantially completely surrounding said core, said outer shell being prepared by a process comprising winding around said core at a second angle said coated fibrous material, wherein at least one of said winding angles is selected to substantially prevent the formation of gaps between adjacent fiber turns.

16. A fuse tube according to claim 15 wherein said first winding angle is from about 45° to about 75°.

17. A fuse tube according to claim 16 wherein said first winding angle is from about 50° to about 70°.

18. A fuse tube according to claim 17 wherein said first winding angle is from about 55° to about 65°.

19. A fuse tube according to claim 18 wherein said first winding angle is about 60°.

20. A fuse tube according to claim 15 wherein said second winding angle is from about 35° to about 70°.

21. A fuse tube according to claim 20 wherein said second winding angle is from about 40° to about 60°.

22. A fuse tube according to claim 21 wherein said second winding angle is from about 45° to about 50°.

23. A fuse tube according to claim 22 wherein said second winding angle is about 48°.

24. A fuse tube according to claim 15 wherein the process further comprises:

(c) curing said coating.

25. A method according to claim 15 wherein both of said winding angles are selected to substantially prevent the formation of gaps between adjacent fiber turns.

26. An arc-quenching matrix comprising a fibrous material coated with an arc-quenching composition which comprises a cured composition of an aromatic epoxy resin and a linear aliphatic epoxy resin.

27. A matrix according to claim 26 wherein said fibrous material is selected from the group consisting of polyester, rayon, acrylic, nylon, cotton and glass fibers.

28. A matrix according to claim 27 wherein said aromatic epoxy resin is selected from the group consisting of a bisphenol A resin and an epoxy novolak resin.

29. A curable fibrous composition comprising a fibrous material coated with a composition which comprises an aromatic epoxy resin and a linear aliphatic epoxy resin.

30. A process for the preparation of an arc-quenching fuse tube comprising:

(a) providing a coated fibrous material; and (b) winding said coated fibrous material around a support member at a winding angle which substantially prevents the formation of gaps between adjacent fiber turns.

31. A process according to claim 30 further comprising:

(c) curing said coating.

32. A process for quenching or suppressing in an electrical system an electrical arc comprising including in the system an arc-quenching fuse tube, wherein at least the inner surface layer of said tube comprises an arc-quenching matrix comprising a fibrous material coated with an arc-quenching composition which comprises a cured composition of an aromatic epoxy resin and a linear aliphatic epoxy resin.

33. A process of using in at least an inner surface layer of a fuse tube to quench or suppress electrical arcing an arc-quenching matrix which comprises a fibrous material coated with an arc-quenching composition comprising a cured composition of an aromatic epoxy resin and a linear aliphatic epoxy resin.

* * * * *

UNITED STATES PATENT AND TRADEMARK OFFICE

CERTIFICATE OF CORRECTION

PATENT NO. : 5,975,145

DATED : November 2, 1999

INVENTOR(S) : Frederick J. Brown; Allan G. Loosemore; Ian J. Harvey; Brent A. Sievers It is certified that error appears in the above-identified patent and that said Letters Patent is hereby corrected as shown below:

Col. 5, line 42, "DERO®" should read --DER®--

Signed and Sealed this

Sixteenth Day of May, 2000

Attest:

Q. TODD DICKINSON

*Attesting Officer*

*Director of Patents and Trademarks*